(12) United States Patent
Jan Stam

(10) Patent No.: US 11,708,813 B2
(45) Date of Patent: Jul. 25, 2023

(54) WIND TURBINE ROTOR BLADE FLOW GUIDING DEVICE AND WIND TURBINE ROTOR BLADE

(71) Applicant: Siemens Gamesa Renewable Energy A/S, Brande (DK)

(72) Inventor: Cornelis Jan Stam, Boulder, CO (US)

(73) Assignee: SIEMENS GAMESA RENEWABLE ENERGY A/S

( * ) Notice: Subject to any disclaimer, the term of this patent is extended or adjusted under 35 U.S.C. 154(b) by 115 days.

(21) Appl. No.: 16/695,539

(22) Filed: Nov. 26, 2019

(65) Prior Publication Data

US 2021/0156356 A1 May 27, 2021

(51) Int. Cl.
F03D 1/06 (2006.01)

(52) U.S. Cl.
CPC .................. F03D 1/0633 (2013.01)

(58) Field of Classification Search
CPC ........... F03D 1/0633; F03D 1/0641; F05B 2240/305; F05B 2240/306; F05B 2240/3062; F05B 2240/304; F05B 2240/3042; F05B 2250/5011
See application file for complete search history.

(56) References Cited

U.S. PATENT DOCUMENTS

| | | | | |
|---|---|---|---|---|
| 8,047,784 B2* | 11/2011 | Bonnet | ................. | F03D 1/0675 416/1 |
| 9,303,621 B2* | 4/2016 | Fuglsang | ............. | F03D 1/0641 |
| 9,920,740 B2* | 3/2018 | Enevoldsen | .......... | F03D 1/0641 |
| 2008/0149205 A1* | 6/2008 | Gupta | .................... | F01D 5/145 137/829 |
| 2012/0269640 A1 | 10/2012 | Enevoldsen et al. | | |

(Continued)

FOREIGN PATENT DOCUMENTS

| | | | | |
|---|---|---|---|---|
| EP | 2514962 A1 | 10/2012 | | |
| EP | 2806156 A1 | 11/2014 | | |
| WO | WO-2009083987 A1 * | 7/2009 | ............. | B64C 11/18 |

(Continued)

OTHER PUBLICATIONS

PCT International Search Report for International Application No. PCT/EP2020/083399, dated Mar. 15, 2021.

(Continued)

*Primary Examiner* — Courtney D Heinle
*Assistant Examiner* — John S Hunter, Jr.
(74) *Attorney, Agent, or Firm* — Schmeiser, Olsen & Watts LLP

(57) ABSTRACT

Provided is a wind turbine rotor blade flow guiding device that includes a first portion including a rear surface for facing a surface of a wind turbine rotor blade and a second portion connected to the first portion and extending from the first portion in a first direction along a length, the second portion including a top surface angled at an angle between 90° and 180° with respect to the rear surface of the first portion. The second portion includes a plurality of corrugations extending along the length. The second portion further includes a plurality of openings configured to allow a flow to pass through the second portion. Further disclosed is a wind turbine and a wind turbine rotor blade each including the wind turbine rotor blade flow guiding device.

20 Claims, 7 Drawing Sheets

(56) References Cited

U.S. PATENT DOCUMENTS

2015/0050154 A1    2/2015   Dixon et al.

FOREIGN PATENT DOCUMENTS

| WO | 2014064626 A2 | 5/2014 |
| WO | 2018083185 | 5/2018 |
| WO | 2019212560 A1 | 11/2019 |

OTHER PUBLICATIONS

Meyer, R. et al. "Drag Reduction on Gurney Flaps by Three-Dimensional Modifications", Journal of Aircraft, American Institute of Aeronautics and Astronautics, Inc., vol. 43, No. 1, 2006. pp. 132-140.

* cited by examiner

WIND TURBINE ROTOR BLADE FLOW GUIDING DEVICE AND WIND TURBINE ROTOR BLADE

FIELD OF TECHNOLOGY

The following relates to a wind turbine rotor blade flow guiding device and wind turbine rotor blade, and more specifically to an flow guiding device that provides advantageous aerodynamic properties for a wind turbine.

BACKGROUND

In wind turbine rotor blades, a blade typically includes an airfoil portion located distal to a shoulder of the blade. A root portion attaches the blade to a rotor. At the portion of the blade located between the root and the shoulder, airfoils often fail to extract power from the wind. This is because the shape of the blade at this region is constrained by structures and transportation. Blade structure in the root and/or transition region are more cylindrical and are limited on chord. Consequently, this region does not produce as much lift as outboard airfoils. Add-ons are use to compensate for this lack of lift that are attached to the blade in this region. However, such add-ons typically increase drag on the blade. Such increases in drag are often accepted in the art due to the increased efficiency and output of these add-on devices.

SUMMARY

An aspect relates to a wind turbine rotor blade flow guiding device comprising: a first portion including a rear surface for facing a surface of a wind turbine rotor blade; and a second portion connected to the first portion and extending from the first portion in a first direction along a length, the second portion including a top surface angled at an angle between 90° and 180° with respect to the rear surface of the first portion; wherein the second portion includes a plurality of corrugations extending along the length, wherein the second portion further includes a plurality of openings configured to allow a flow to pass through the second portion.

In exemplary embodiments, the first portion and the second portion are made of one piece. Moreover, a transition portion is arranged between the first portion and the second portion, and wherein the plurality of corrugations extend into the transition portion. Further, the top surface of the second portion is arranged at an angle between 110° and 160° with respect to the rear surface of the first portion. The plurality of openings may include a plurality of elongated slits disposed over a width of the second portion, the plurality of elongated slits extending in the first direction. Alternatively or additionally, the plurality of openings each include a plurality of elongated slits extending perpendicular to the first direction. The plurality of openings may further include a plurality of rows of the elongated slits. Alternatively or additionally, the plurality of openings include a plurality of elongated slits extending perpendicular to the first direction each having an inverted V-shape. The plurality of openings may further include a plurality of rows of the elongated slits.

Another aspect relates to a wind turbine rotor blade comprising: a span direction; a root portion; a shoulder; and a wind turbine rotor blade flow guiding device including: a first portion including a rear surface for facing a surface of a wind turbine rotor blade; and a second portion connected to the first portion and extending from the first portion in a first direction along a length, the second portion including a top surface angled at an angle between 90° and 180° with respect to the rear surface of the first portion; wherein the second portion includes a plurality of corrugations extending along the length, wherein the second portion further includes a plurality of openings configured to allow a flow to pass through the second portion, wherein the wind turbine rotor blade flow guiding device is connected to the blade such that the rear surface of the first portion faces a surface of the blade, and wherein the wind turbine rotor blade flow guiding device is connected to the wind turbine rotor blade between the root portion and the shoulder in the span direction.

In exemplary embodiments, the first portion and the second portion are made of one piece. Moreover, a transition portion is arranged between the first portion and the second portion, and wherein the plurality of corrugations extend into the transition portion. Further, the top surface of the second portion is arranged at an angle between 110° and 160° with respect to the rear surface of the first portion. The plurality of openings may include a plurality of elongated slits disposed over a width of the second portion, the plurality of elongated slits extending in the first direction. Alternatively or additionally, the plurality of openings each include a plurality of elongated slits extending perpendicular to the first direction. The plurality of openings may further include a plurality of rows of the elongated slits. Alternatively or additionally, the plurality of openings include a plurality of elongated slits extending perpendicular to the first direction each having an inverted V-shape. The plurality of openings may further include a plurality of rows of the elongated slits. In exemplary embodiments, the wind turbine rotor blade includes a backing structure attached to the wind turbine rotor blade flow guiding device and the surface of the blade configured to provide structural support for the wind turbine rotor blade flow guiding device.

Another aspect relates to a wind turbine comprising: a plurality of rotor blades, each of the plurality of rotor blades including: a span direction; a root portion; a shoulder; and a wind turbine rotor blade flow guiding device including: a first portion including a rear surface for facing a surface of a wind turbine rotor blade; and a second portion connected to the first portion and extending from the first portion in a first direction along a length, the second portion including a top surface angled at an angle between 90° and 180° with respect to the rear surface of the first portion, wherein the second portion includes a plurality of corrugations extending along the length, wherein the second portion further includes a plurality of openings configured to allow a flow to pass through the second portion, wherein the wind turbine rotor blade flow guiding device is connected to the blade such that the rear surface of the first portion faces a surface of the blade, and wherein the wind turbine rotor blade flow guiding device is connected to the wind turbine rotor blade between the root portion and the shoulder in the span direction.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

In brief overview, the present invention provides a wind turbine rotor blade flow guiding device that can be attached to a wind turbine rotor blade that increases the aerodynamic properties of the wind turbine rotor blade. Further, the present invention provides wind turbines and wind turbine rotor blades having one or more of the flow guiding devices installed thereon. The inventive flow guiding device is advantageously attachable to a trailing edge of the wind turbine rotor blade on a pressure side of the blade in order to improve the energy capturing characteristics of the wind turbine and the blade thereof by improving the lift generated by the blade when attached in the contemplated location. While improving lift, the inventive flow guiding devices contemplated herein are further enhanced by a drag reduction feature. Specifically, the flow guiding devices contemplated herein include openings configured to allow flow to pass therethrough, energizing the wake of the flow behind the blade and the flow guiding device thereof, and thereby reducing the size of the wake and resulting in a reduction in drag.

Figure 1:
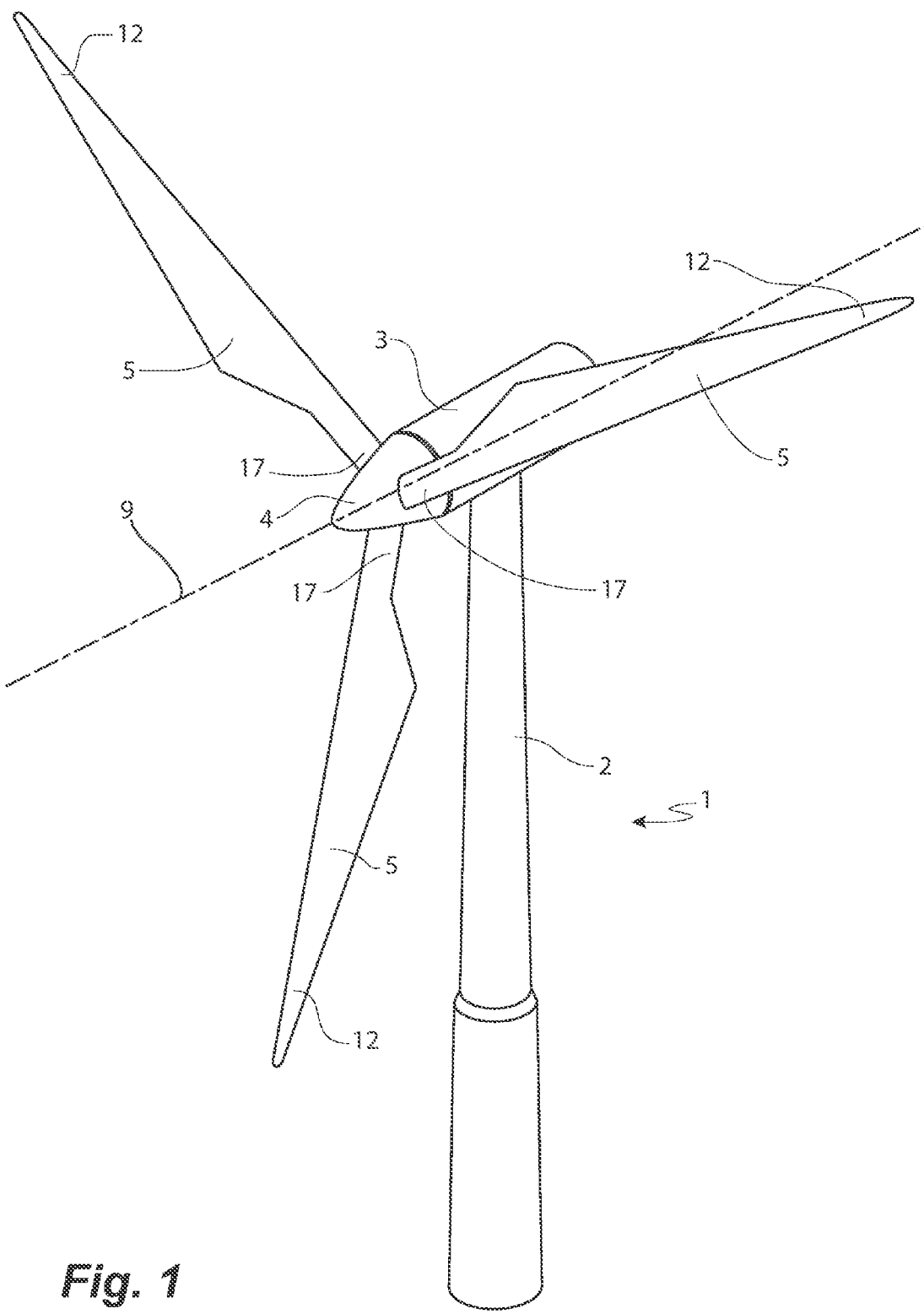
FIG. 1 depicts a perspective view of a wind turbine, in accordance with embodiments of the present invention.

Referring now to the drawings, FIG. 1 depicts a perspective view of a wind turbine 1, in accordance with embodiments of the present invention. The wind turbine 1 includes a tower 2, a nacelle 3, and a hub 4. The nacelle 3 is located on top of the tower 2. The hub 4 includes a number of wind turbine blades 5. The hub 4 is pivotably mounted such that the hub 4 is able to rotate about a rotational axis 9. A generator may be located inside the nacelle 3. The wind turbine 1 is a direct drive wind turbine. While FIG. 1 may depict an exemplary wind turbine, the invention is not limited to the configuration shown, and the flow guiding devices described herein may be attachable to any wind turbine rotor blade.

Figure 2:
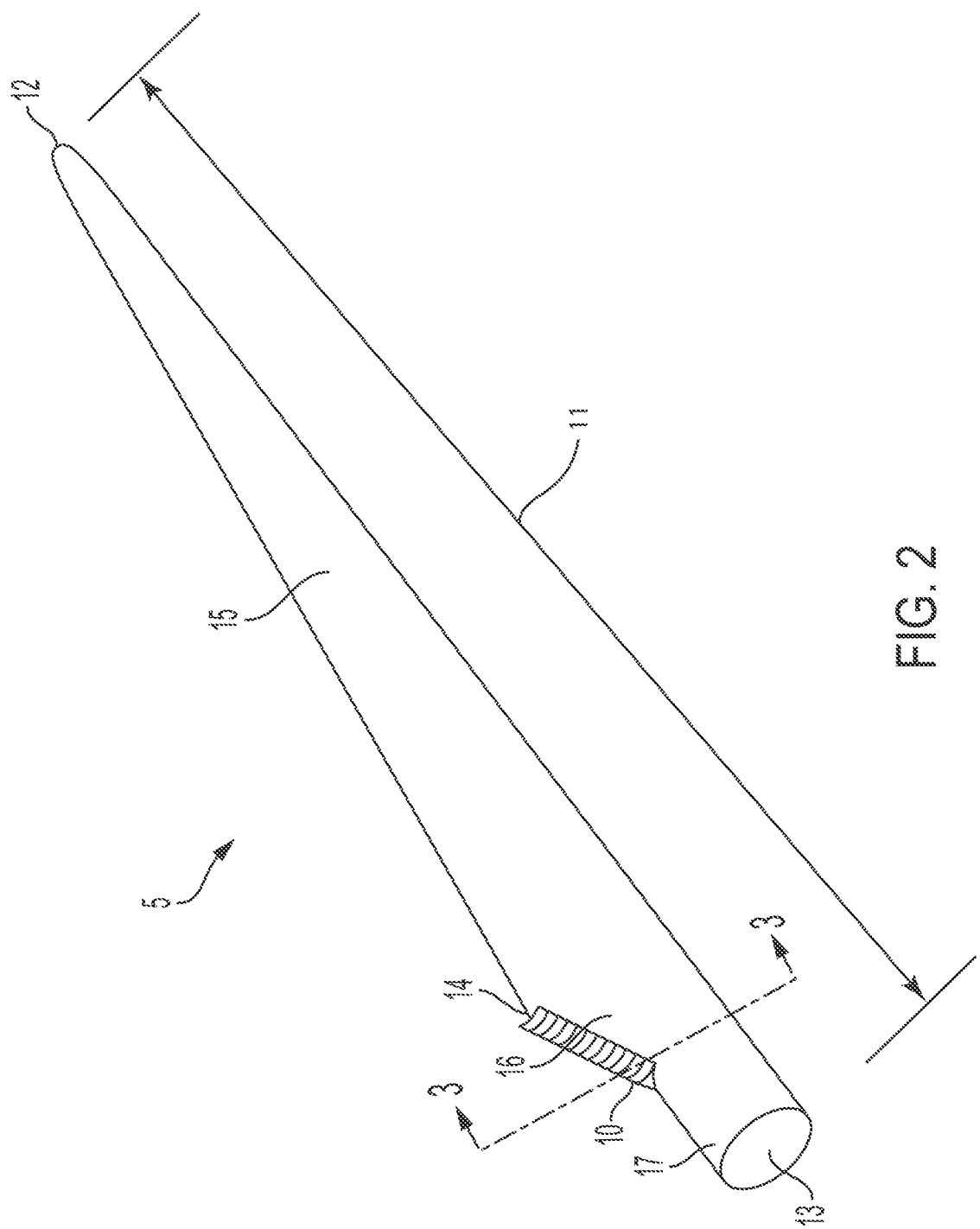
FIG. 2 depicts a perspective view of a wind turbine rotor blade provided with a plurality of flow guiding devices, in accordance with embodiments of the present invention.

FIG. 2 depicts a perspective view of a wind turbine rotor blade 5 provided with a plurality of flow guiding devices 10, in accordance with embodiments of the present invention. While the features and dimensions of the wind turbine rotor blade 5 are shown as a blade would usually be configured for a three-blade rotor, the invention is not limited to three blade rotors or the shown configuration. For example, the invention may be implemented on one-blade or two-blade rotors.

The rotor blade 5 is shown including a root region 17 extending from a root 13. The root 13 includes a cylindrical profile. A transition region 16 extends from the root region to a shoulder 14. The shoulder 14 is defined as the location of its maximum profile depth, i.e. the maximum chord length of the blade 5. From the shoulder 14, the rotor blade 5 extends to a tip 12. The tip 12 forms the outermost part of the blade 5. The cylindrical profile of the root portion 13 serves to fix the blade 5 to a bearing of the rotor hub 4. Between the shoulder 14 and the tip 12 an airfoil portion 15 extends that has an aerodynamically shaped profile. In the transition region 16, a transition takes place from the aerodynamic profile of the airfoil portion 15 to the cylindrical profile of the root portion 13.

The span of the blade 5 is designated by reference numeral 11. The inventive rotor blade flow guiding devices 10 may be located at the rotor blade 5 between the root portion 13 and the shoulder 14 in the span direction. This means that the distance between the rotor blade flow guiding devices 10 and the root 13 in the span direction may be less than the distance between the shoulder 14 and the root 13 in the span direction.

As shown in FIG. 2, the plurality of flow guiding device 10 are disposed on the transition region 16 of the wind turbine rotor blade 5. Specifically, a rear surface of the flow guiding device 10 may be attached or otherwise connected to an outer surface of the rotor blade 5 at the transition region 16. Attachment of the flow guiding devices 10 may be provided via adhesive, bolts, welding, or any other form of attachment. While the plurality of flow guiding devices 10 are shown attached to the transition region 16 of the wind turbine 5, it is contemplated to attach one or more flow guiding devices 10 anywhere between the root 13 and the shoulder 14. Thus, it is contemplated to attach one or more flow guiding devices 10 to the root region 17 and/or instead of the transition region 16. Further, it is also contemplated that one or more flow guiding devices 10 may extend beyond the root region 17 and/or the transition region 16 and into at least a portion of the span 11 of the blade 5.

Figure 3:
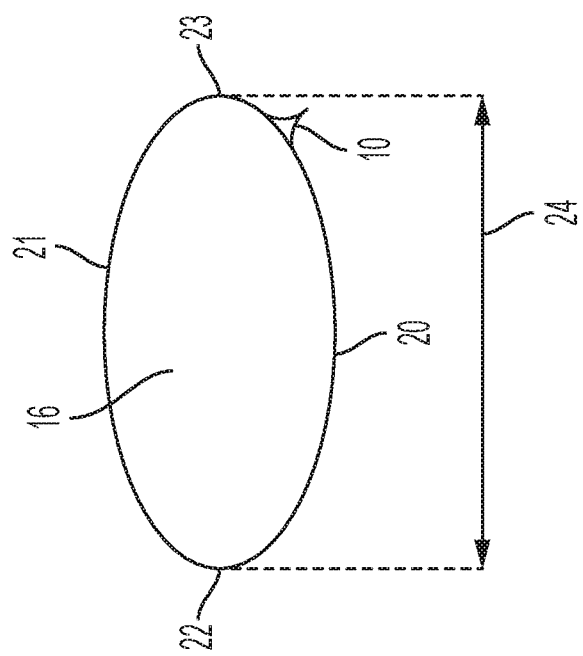
FIG. 3 depicts a cross sectional view of the wind turbine rotor blade shown in FIG. 2, taken at arrows 3-3, in accordance with embodiments of the present invention.

FIG. 3 depicts a cross sectional view of the wind turbine rotor blade 5 shown in FIG. 2, taken at arrows 3-3, in accordance with embodiments of the present invention. The rotor blade 5 is shown as a cross section of the transition region 16. The aerodynamic profile shown in FIG. 3 comprises a pressure side 20 and a suction side 21, along with a chord length 24 extending between a leading edge 22 and a trailing edge 23. The blade flow guiding device 10 is shown located proximate the trailing edge 23 on the pressure side 20 of the aerodynamic profile. The blade flow guiding device 10 may be located anywhere on the pressure side 20 of the aerodynamic profile. As shown, the blade flow guiding device 10 is shown proximate the trailing edge 23 without extending beyond the chord length 24 of the aerodynamic profile of the blade 5. The blade flow guiding device 10 may also be located closer to the trailing edge 23 than the embodiment shown, but still on the trailing edge half of the pressure side 20 of the blade 5.

Figure 4:
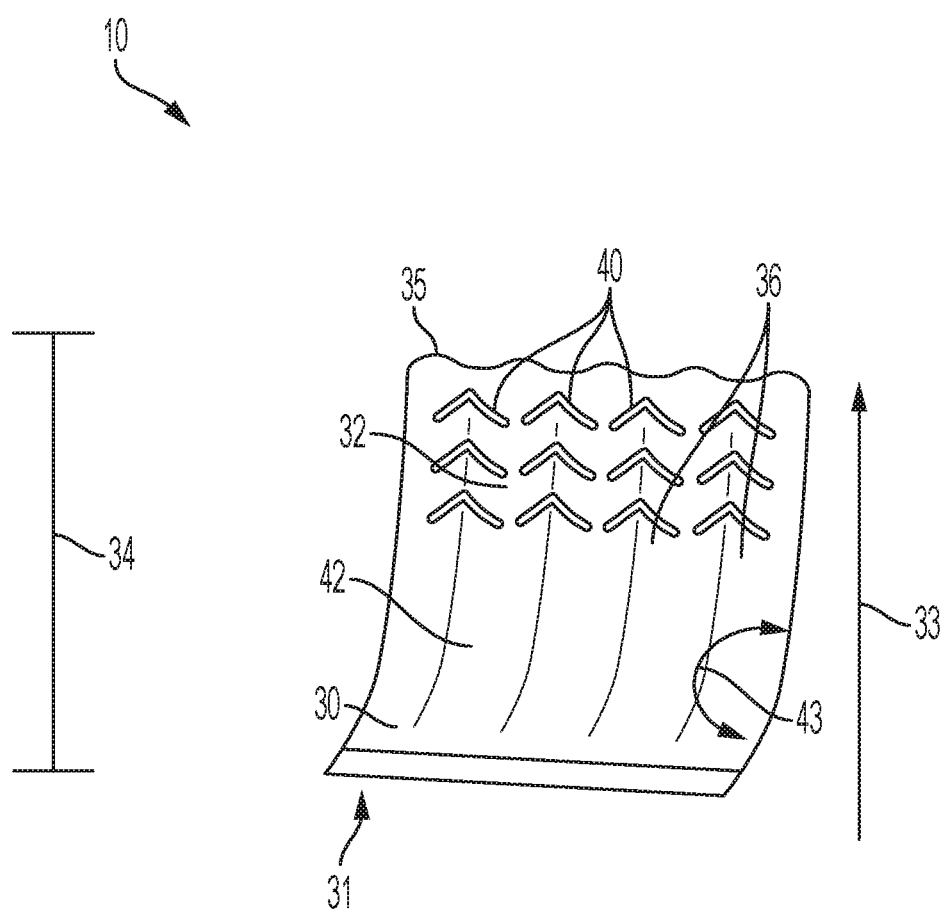
FIG. 4 depicts a perspective view of one of the flow guiding devices of FIG. 2, in accordance with embodiments of the present invention.

FIG. 4 depicts a perspective view of one of the flow guiding devices 10 of FIG. 2, in accordance with embodiments of the present invention. The flow guiding device 10 includes a first portion 30 having a rear surface 31 for facing a surface of a wind turbine rotor blade. The flow guiding device 10 further includes a second portion 32 connected to the first portion 30 and extending from the first portion 30 in a first direction 33 along a length 34 of the second portion 32. The second portion 32 includes a top surface 35 angled at an angle 43 with respect to the rear surface 31 of the first portion 30. The second portion 32 includes a plurality of corrugations 36 extending along the length 34. The second portion 32 further includes a plurality of openings 40 configured to allow a flow to pass through the second portion 32. By allowing flow, such as airflow, to pass through the plurality of openings 40, the flow guiding device 10 may be configured to energizing the wake of the flow behind the blade and the flow guiding device thereof, and thereby reducing the size of the wake and resulting in a reduction in drag relative to a flow guiding device 10 having the same structure but without the openings 40. The openings 40 may not create addition cost in terms of load, while increasing efficiency. A transition portion 42 is arranged between the first portion 30 and the second portion 32 defining the transition between the first portion 30 and the second portion 32. The transition portion 42 may be the bent portion of the flow guiding device 10. The plurality of corrugations 36 extend at least partially into the transition portion 42.

The plurality of openings 40 in the second portion 32 of the flow guiding device 10 include a plurality of elongated slits extending perpendicular to the first direction 33 each having an inverted V-shape. Further, the plurality of elongated slits are arranged in a plurality of rows. Specifically, the second portion 32 includes four openings 40 in each row. Each of the openings corresponds to one of the corrugations 36 so that the apex of the inverted V shape is located within a channel or groove of the corrugation 36. Three rows of openings 40 extend perpendicular to the first direction 33. The top row of the openings 40 is shown proximate the top surface 35 of the second portion 32. The middle and lower rows of the openings 40 are disposed increasingly closer to the transition portion 42. However, each even the lowest row is shown closer to the top surface 35 than the transition portion 42. Equal spacing is provided in the embodiment shown between each of the rows.

Figure 5:
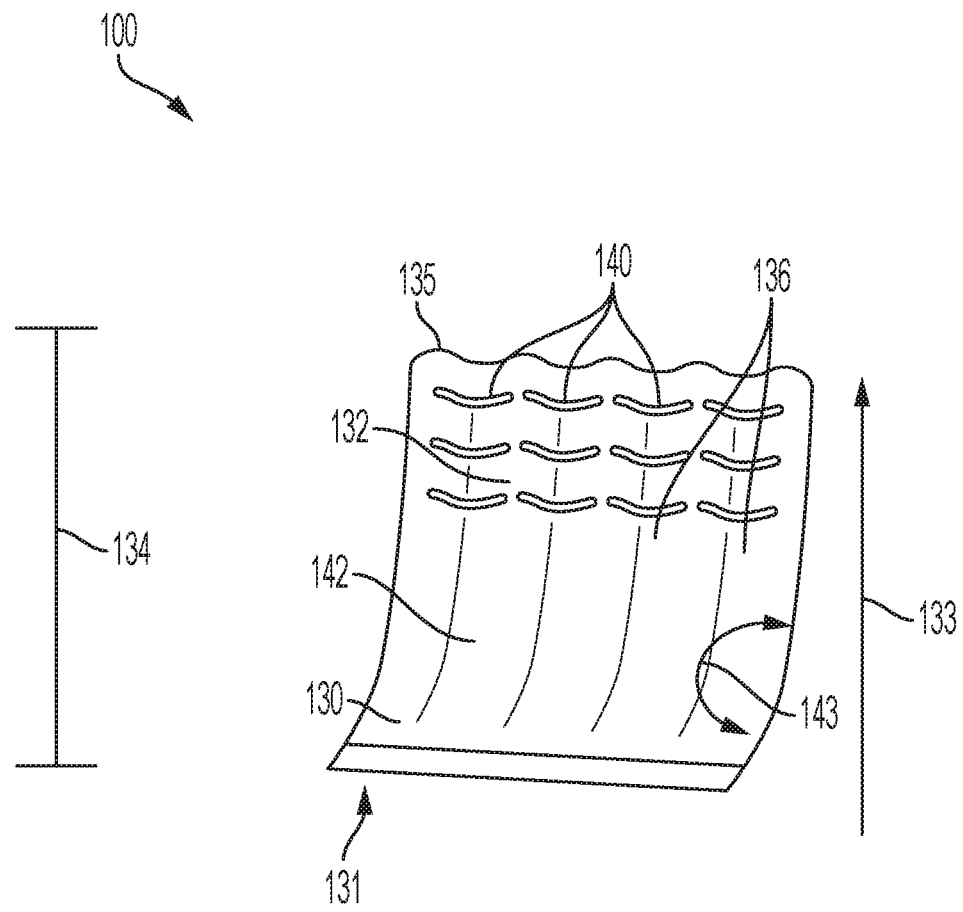
FIG. 5 depicts another exemplary flow guiding device, in accordance with embodiments of the present invention.

FIG. 5 depicts another exemplary flow guiding device 100, in accordance with embodiments of the present invention. Like the flow guiding device 10, the flow guiding device 100 includes a first portion 130 having a rear surface 131 for facing a surface of a wind turbine rotor blade. The flow guiding device 100 further includes a second portion 132 connected to the first portion 130 and extending from the first portion 130 in a first direction 133 along a length 134 of the second portion 132. The second portion 132 includes a top surface 135 angled at an angle 143 with respect to the rear surface 131 of the first portion 130. The second portion 132 includes a plurality of corrugations 136 extending along the length 134. A transition portion 142 is arranged between the first portion 130 and the second portion 132 defining the transition between the first portion 130 and the second portion 132. The transition portion 142 may be the bent portion of the flow guiding device 100. The plurality of corrugations 136 extend at least partially into the transition portion 142. Like the second portion 32 of the flow guiding device 10, the second portion 132 further includes a plurality of openings 140 configured to allow a flow to pass through the second portion 132. By allowing flow, such as airflow, to pass through the plurality of openings 140, the flow guiding device 100 may be configured to energizing the wake of the flow behind the blade and the flow guiding device thereof, and thereby reducing the size of the wake and resulting in a reduction in drag relative to a flow guiding device 100 having the same structure but without the openings 140. The openings 140 may not create addition cost in terms of load, while increasing efficiency.

The plurality of openings 140 in the second portion 132 of the flow guiding device 100 include a plurality of elongated slits extending perpendicular to the first direction 133. Unlike the plurality of openings 40 of the flow guiding device 10, the plurality of openings 140 are shown as straight perpendicular slits without an inverted V-shape. Like the plurality of openings 40 of the flow guiding device 10, the plurality of elongated slits are arranged in a plurality of rows. Specifically, the second portion 132 includes four openings 140 in each row. Each of the openings corresponds to one of the corrugations 136. Three rows of openings 140 extend perpendicular to the first direction 133. The top row of the openings 140 is shown proximate the top surface 135 of the second portion 132. The middle and lower rows of the openings 140 are disposed increasingly closer to the transition portion 142. However, each even the lowest row is shown closer to the top surface 135 than the transition portion 142. Equal spacing is provided in the embodiment shown between each of the rows.

Figure 6:
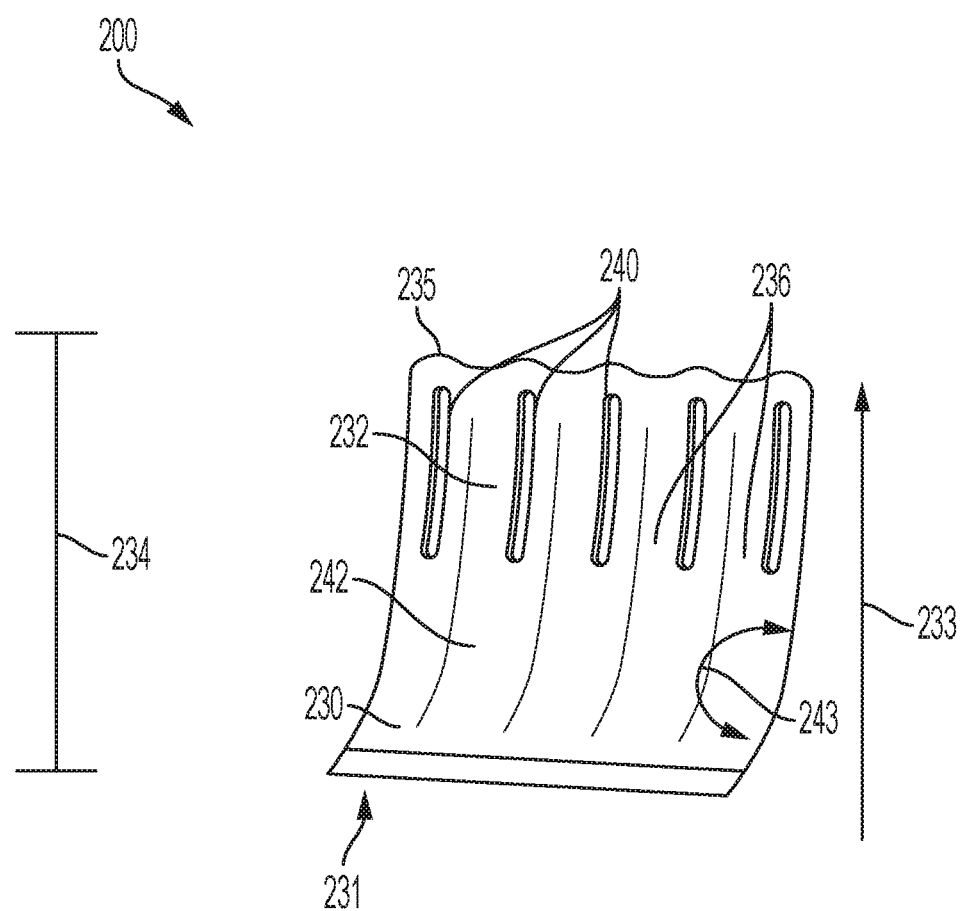
FIG. 6 depicts another exemplary flow guiding device, in accordance with embodiments of the present invention.

FIG. 6 depicts another exemplary flow guiding device 200, in accordance with embodiments of the present invention. Like the flow guiding devices 10, 100 the flow guiding device 200 includes a first portion 230 having a rear surface 231 for facing a surface of a wind turbine rotor blade. The flow guiding device 200 further includes a second portion 232 connected to the first portion 230 and extending from the first portion 230 in a first direction 233 along a length 234 of the second portion 232. The second portion 232 includes a top surface 235 angled at an angle 243 with respect to the rear surface 231 of the first portion 230. The second portion 232 includes a plurality of corrugations 236 extending along the length 234. A transition portion 242 is arranged between the first portion 230 and the second portion 232 defining the transition between the first portion 230 and the second portion 232. The transition portion 242 may be the bent portion of the flow guiding device 210. The plurality of corrugations 236 extend at least partially into the transition portion 242. Like the second portions 32, 132 of the flow guiding devices 10, 100, the second portion 232 further includes a plurality of openings 240 configured to allow a flow to pass through the second portion 232. By allowing flow, such as airflow, to pass through the plurality of openings 240, the flow guiding device 200 may be configured to energizing the wake of the flow behind the blade and the flow guiding device thereof, and thereby reducing the size of the wake and resulting in a reduction in drag relative to a flow guiding device 200 having the same structure but without the openings 240. The openings 240 may not create addition cost in terms of load, while increasing efficiency.

The plurality of openings 240 in the second portion 232 of the flow guiding device 100 include a plurality of elongated slits disposed over a width of the second portion 232. Unlike the openings 40, 140 of the flow guiding devices 10, 100, the plurality of openings 240 extend in the first direction 233 parallel to the side edges of the flow guiding device 200. The vertically extending openings 240 correspond to the corrugations 234 with each of the individual openings 240 located at an apex or ridge of each of the corrugations 234. Thus, there are five openings 240 disposed across the ridges of each of the five corrugations 234. Each of the openings 240 extend the same distance along the second portion 232 of the flow guiding device 200.

While each of the flow guiding devices 10, 100, 200 show various dispositions of the openings 40, 140, 240, it should be understood that various other embodiments are contemplated having more openings, less openings, openings shaped or sized differently, or openings arranged differently. For example, more or less than three rows of perpendicularly disposed openings are contemplated. More or less than five vertically running openings are contemplated. In one embodiment, a plurality of circular openings may be disposed in the second portions of a flow guiding device. Whatever the embodiment, the goal of any opening arrangement may be to mitigate or reduce drag by energizing the wake of the flow behind the blade and the flow guiding device thereof, and thereby reducing the size of the wake and resulting in a reduction in drag relative to a flow guiding device 10, 100, 200 having the same structure but without having openings therein.

In each of the embodiments of the flow guiding devices 10, 100, 200 described hereinabove, the first portion 30, 130, 230 and the second portion 32, 132, 232 may be made of one piece or otherwise be integrally formed. For example, the flow guiding devices 10, 100, 200 may each be a corrugated and bent structure made of an integral metallic or composite material. The plurality of corrugations 34, 134, 234 may extend parallel to side edges of the flow guiding device 10 in the direction 33, 133, 233. While the rear surface 31, 131, 231 of the first portion 30, 130, 230 may appear straight in each of the flow guiding devices 10, 100, 200, the rear surface 31, 130, 230 may include a curvature corresponding to the curvature of a wind turbine rotor blade surface to which the flow guiding device 10, 100, 200 is configured to be attached.

While embodiments of the flow guiding devices 10, 100, 200 are contemplated in which the second portion 32, 132, 232 and the first portion 30, 130, 230 are angled at an angle 43, 143, 243 anywhere between 90° and 180° relative to each other, a narrower range may be desirable. For example, the top surface 35, 135, 235 of the second portion 32, 132, 232 may be arranged at an angle between 110° and 160° with respect to the rear surface 31, 131, 231 of the first portion 30, 130, 230.

Figure 7:
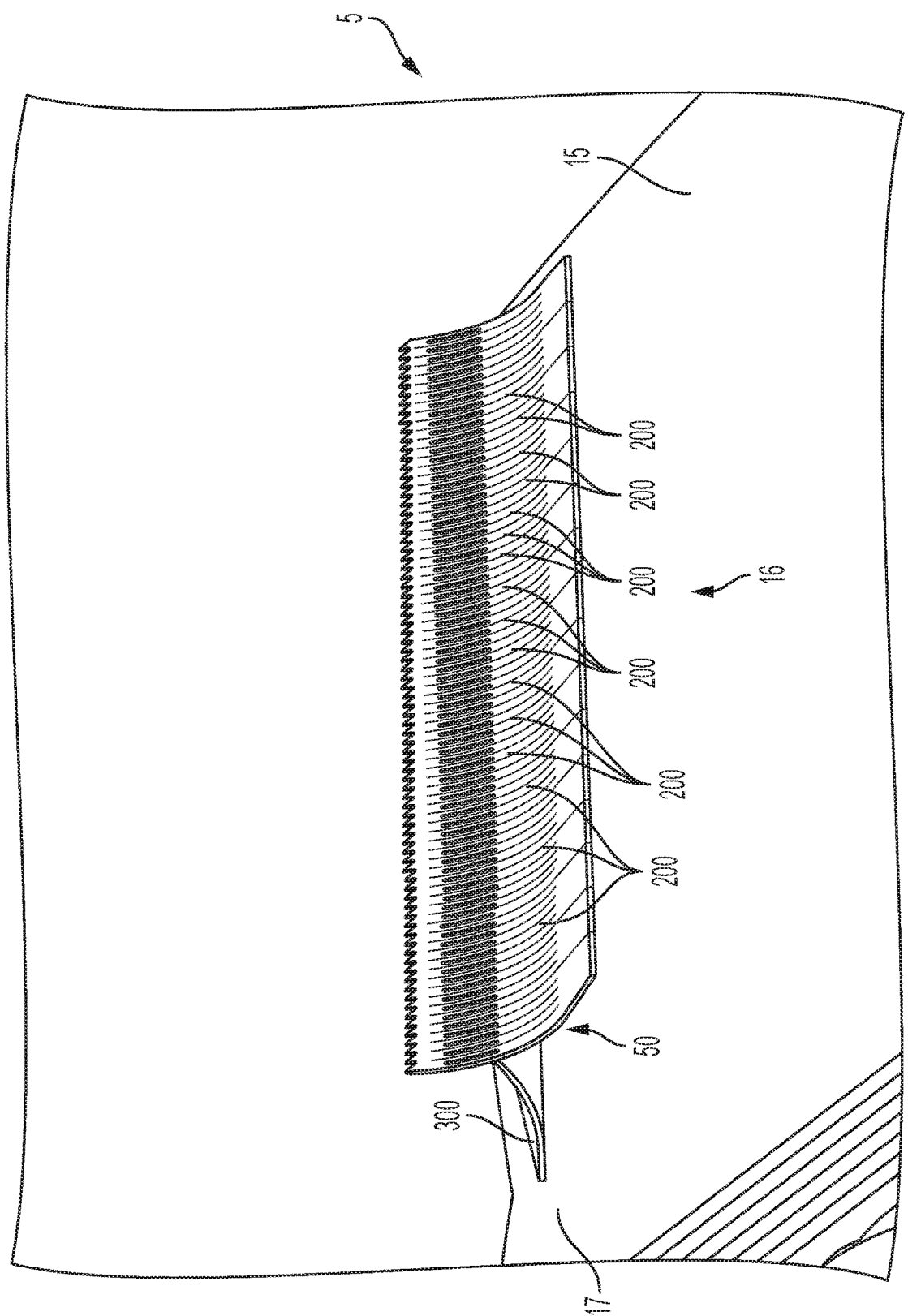
FIG. 7 depicts a perspective view of a transition region of the wind turbine rotor blade of FIG. 2, in accordance with embodiments of the present invention.

FIG. 7 depicts a perspective view of the transition region 16 of the wind turbine rotor blade 5 of FIG. 2, in accordance with embodiments of the present invention. The transition region 16 is shown between the root region 17 and the airfoil portion 15 of the blade 5. The transition region 16 is shown including sixteen of the flow guiding devices 200 attached across the region 16 to a surface 50 of the blade 5. A backing structure 300 is attached to the wind turbine rotor blade flow guiding device 200 and the surface 50 of the blade 5 configured to provide structural support for the wind turbine rotor blade flow guiding device 200. Like the sixteen flow guiding devices 200, there may be sixteen separate backing structures 300. In the embodiment shown, both the backing structures 300 and the flow guiding devices 200 may be adhered to the surface 50 of the blade 5. The backing structure 300 may be short enough so as to not overlap the second portion 242 of the flow guiding device 200 where the openings 240 are located. Alternatively, the openings 240 may extend through each of the flow guiding device 200 and the backing structure 300. While the embodiment shows a single type of the flow guiding device 200 located across the entire span of the transition region 16, other embodiments may include having different flow guiding devices 200 attached at different locations along the span of the transition region 16. For example, it may be desirable to include flow guiding devices having one style of opening at one end of the transition region, but flow guiding devices including another style of opening at the opposite end of the transition region. Thus, it is contemplated to include different flow guiding devices with different opening structures on the same rotor blade.

While flow guiding devices are contemplated with machined openings as shown in the flow guiding devices 10, 100, 200, other embodiments contemplated include utilizing a porous material for at least some of the second portions 32, 132, 232. A porous material may allow some flow to pass therethrough to accomplish a similar drag reducing effect as machined openings.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A wind turbine rotor blade flow guiding device comprising:
   a first portion including a rear surface for facing a surface of a wind turbine rotor blade; and
   a second portion connected to the first portion and extending from the first portion in a first direction along a length, the second portion including a top surface angled at an angle between 90° and 180° with respect to the rear surface of the first portion;
   wherein the second portion includes a plurality of corrugations extending along the length, wherein the second portion further includes a plurality of openings configured to allow a flow to pass through the second portion, wherein the second portion has a thickness that extends between the top surface and a back face disposed opposite the top surface, and wherein each of the plurality of openings create an enclosed hole through the thickness such that the flow enters each of the plurality of openings through the top surface emerges from the back face, wherein the airflow that emerges from the back face through the plurality of openings is configured to energize a wake of the flow behind the back face of the wind turbine rotor blade flow guiding device, wherein the plurality of openings are disposed within the second portion in an arrangement that corresponds to the plurality of corrugations and wherein there is a single opening or row of openings for each corrugation.

2. The wind turbine rotor blade flow guiding device of claim 1, wherein the first portion and the second portion are made of one piece.

3. The wind turbine rotor blade flow guiding device of claim 2, wherein a transition portion is arranged between the first portion and the second portion, and wherein the plurality of corrugations extend into the transition portion.

4. The wind turbine rotor blade flow guiding device of claim 3, wherein the second portion includes solid structure fully surrounding each of the plurality of openings such that each of the plurality of openings creates a profile which is surrounded by the solid structure.

5. The wind turbine rotor blade flow guiding device of claim 1, wherein the top surface of the second portion is arranged at an angle between 110° and 160° with respect to the rear surface of the first portion.

6. The wind turbine rotor blade flow guiding device of claim 1, wherein the plurality of openings includes a plurality of elongated slits extending perpendicular to the first direction each having an inverted V-shape.

7. The wind turbine rotor blade flow guiding device of claim 6, wherein the plurality of openings includes a plurality of rows of the elongated slits.

8. The wind turbine rotor blade flow guiding device of claim 1, wherein the plurality of corrugations extend upstream from the plurality of openings.

9. The wind turbine rotor blade flow guiding device of claim 1, wherein the plurality of corrugations extend perpendicular to the plurality of openings.

10. A wind turbine rotor blade comprising:
a span direction;
a root portion;
a shoulder; and
a wind turbine rotor blade flow guiding device including:
a first portion including a rear surface for facing a surface of the wind turbine rotor blade; and
a second portion connected to the first portion and extending from the first portion in a first direction along a length, the second portion including a top surface angled at an angle between 90° and 180° with respect to the rear surface of the first portion;
wherein the second portion includes a plurality of corrugations extending along the length, wherein the second portion further includes a plurality of openings configured to allow a flow to pass through the second portion, wherein the second portion has a thickness that extends between the top surface and a back face disposed opposite the top surface, and wherein each of the plurality of openings create an enclosed hole through the thickness such that the flow enters each of the plurality of openings through the top surface emerges from the back face such that airflow that emerges from the back face, wherein the airflow that emerges from the back face through the plurality of openings is configured to energize a wake of the flow behind the back face of the wind turbine rotor blade flow guiding device, wherein the plurality of openings are disposed within the second portion in an arrangement that corresponds to the plurality of corrugations and wherein there is a single opening or row of openings for each corrugation,
wherein the wind turbine rotor blade flow guiding device is connected to the wind turbine rotor blade such that the rear surface of the first portion faces the surface of the wind turbine rotor blade, and
wherein the wind turbine rotor blade flow guiding device is connected to the wind turbine rotor blade between the root portion and the shoulder in the span direction.

11. The wind turbine rotor blade 10, wherein the first portion and the second portion of the wind turbine rotor blade flow guiding device are made of one piece.

12. The wind turbine rotor blade of claim 11, wherein a transition portion is arranged between the first portion and the second portion of the wind turbine rotor blade flow guiding device, and wherein the plurality of corrugations extend into the transition portion.

13. The wind turbine rotor blade of claim 10, wherein the top surface of the second portion of the wind turbine rotor blade flow guiding device is arranged at an angle between 110° and 160° with respect to the rear surface of the first portion.

14. The wind turbine rotor blade of claim 10, wherein the plurality of openings of the wind turbine rotor blade flow guiding device includes a plurality of elongated slits extending perpendicular to the first direction each having an inverted V-shape.

15. The wind turbine rotor blade of claim 14, wherein the plurality of openings includes a plurality of rows of the elongated slits.

16. The wind turbine rotor blade of claim 10, further comprising a backing structure attached to the wind turbine rotor blade flow guiding device and the surface of the wind turbine rotor blade configured to provide structural support for the wind turbine rotor blade flow guiding device.

17. The wind turbine rotor blade of claim 10, wherein the plurality of corrugations extend upstream from the plurality of openings.

18. The wind turbine rotor blade of claim 10, wherein the plurality of corrugations extend perpendicular to the plurality of openings.

19. The wind turbine rotor blade of claim 18, wherein the second portion includes solid structure fully surrounding each of the plurality of openings such that each of the plurality of openings creates a profile which is surrounded by the solid structure.

20. A wind turbine comprising:
a plurality of rotor blades, each of the plurality of rotor blades including:
a span direction;
a root portion;
a shoulder; and
a wind turbine rotor blade flow guiding device including:
a first portion including a rear surface for facing a surface of one of the plurality of rotor blades; and
a second portion connected to the first portion and extending from the first portion in a first direction along a length, the second portion including a top surface angled at an angle between 90° and 180° with respect to the rear surface of the first portion,
wherein the second portion includes a plurality of corrugations extending along the length, wherein the second portion further includes a plurality of openings configured to allow a flow to pass through the second portion, wherein the second portion has a thickness that extends between the top surface and a back face disposed opposite the top surface, and wherein each of the plurality of openings create an enclosed hole through the thickness such that the flow enters each of the plurality of openings through the top surface emerges from the back face and such that airflow that emerges from the back face, wherein the airflow that emerges from the back face through the plurality of openings is configured to energize a wake of the flow behind the back face of the wind turbine rotor blade flow guiding device, wherein the plurality of openings are disposed within the second portion in an arrangement that corresponds to the plurality of corrugations and wherein there is a single opening or row of openings for each corrugation,
wherein the wind turbine rotor blade flow guiding device is connected to the wind turbine rotor blade such that the rear surface of the first portion faces the surface of the wind turbine rotor blade, and wherein the wind turbine rotor blade flow guiding device is connected to the wind turbine rotor blade between the root portion and the shoulder in the span direction.

* * * * *